(12) United States Patent
Zheng

(10) Patent No.: US 10,386,578 B2
(45) Date of Patent: Aug. 20, 2019

(54) METHOD FOR MAKING BENT TIP FIBERS

(71) Applicant: AFL TELECOMMUNICATIONS LLC, Duncan, SC (US)

(72) Inventor: Wenxin Zheng, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 195 days.

(21) Appl. No.: 15/123,928

(22) PCT Filed: Mar. 16, 2015

(86) PCT No.: PCT/US2015/020711
§ 371 (c)(1),
(2) Date: Sep. 6, 2016

(87) PCT Pub. No.: WO2015/139024
PCT Pub. Date: Sep. 17, 2015

(65) Prior Publication Data
US 2017/0017041 A1  Jan. 19, 2017

Related U.S. Application Data

(60) Provisional application No. 61/953,137, filed on Mar. 14, 2014.

(51) Int. Cl.
*G02B 6/32* (2006.01)
*C03B 37/15* (2006.01)
*G02B 6/26* (2006.01)

(52) U.S. Cl.
CPC ............... *G02B 6/32* (2013.01); *C03B 37/15* (2013.01); *G02B 6/262* (2013.01)

(58) Field of Classification Search
CPC .... C03B 37/15; G02B 6/2552; G02B 6/2553; G02B 6/287; G02B 6/2551; G02B 6/4289; G02B 6/2555
See application file for complete search history.

(56) References Cited

U.S. PATENT DOCUMENTS

| | | | |
|---|---|---|---|
| 4,693,244 A * | 9/1987 | Daikuzono | A61B 18/22 606/16 |
| 4,768,855 A * | 9/1988 | Nishi | G02B 6/2555 385/137 |

(Continued)

FOREIGN PATENT DOCUMENTS

DE        4106548        9/1992

OTHER PUBLICATIONS

Nov. 2, 2014[retrieved from the internet] http://highpak.com/fibre.html [retrieved on Aug. 25, 2017] "Various types of lensed fibres".

(Continued)

*Primary Examiner* — Jason L Lazorcik
(74) *Attorney, Agent, or Firm* — Dority & Manning, P.A.

(57) ABSTRACT

A method of making a bent tip fiber ball lens by moving a bender to a first side of a ball lens at an end of an optical fiber that has a first axis; moving the bender in a first direction such that the bender applies a force to the ball lens, wherein the ball lens and optical fiber is bent such that a first angle between the first axis and a second axis, which extends from an end of the ball lens and the end of the optical fiber is greater than zero; applying heat, for a first time, to the optical fiber at a location that is a first distance from the ball lens; removing the heat and allowing the optical fiber to harden such that the first angle is maintained after the bender force is removed.

13 Claims, 4 Drawing Sheets

(56) References Cited

U.S. PATENT DOCUMENTS

| | | | | |
|---|---|---|---|---|
| 4,804,248 | A * | 2/1989 | Bhagavatula | H04B 10/2581 385/28 |
| 4,830,490 | A * | 5/1989 | Kakii | G02B 6/2551 356/153 |
| 5,139,495 | A * | 8/1992 | Daikuzono | A61B 18/22 606/17 |
| 5,333,217 | A * | 7/1994 | Kossat | G02B 6/2852 385/13 |
| 5,416,878 | A * | 5/1995 | Bruce | A61B 18/24 128/897 |
| 5,517,590 | A | 5/1996 | Auborn et al. | |
| 5,566,267 | A * | 10/1996 | Neuberger | C03B 37/01493 385/123 |
| 5,677,978 | A * | 10/1997 | Lewis | B82Y 35/00 385/125 |
| 6,370,306 | B1 * | 4/2002 | Sato | B82Y 20/00 385/12 |
| 6,396,966 | B1 * | 5/2002 | Lewis | B01L 3/0244 385/12 |
| 6,430,324 | B1 * | 8/2002 | Muramatsu | G01Q 60/22 385/12 |
| 6,600,856 | B1 * | 7/2003 | Lewis | B82Y 20/00 219/121.66 |
| 6,640,028 | B1 * | 10/2003 | Schroll | G02B 6/2852 385/32 |
| 7,197,217 | B1 * | 3/2007 | Voyagis | C03B 37/028 385/115 |
| 8,261,442 | B2 | 9/2012 | Zheng | |
| 8,721,631 | B2 * | 5/2014 | Neuberger | A61B 18/22 606/13 |
| 2003/0138753 | A1 * | 7/2003 | Galarza | A61C 19/004 433/29 |
| 2004/0067026 | A1 * | 4/2004 | Kanda | G02B 6/2551 385/52 |
| 2004/0264892 | A1 * | 12/2004 | Arima | G02B 6/2551 385/97 |
| 2010/0119199 | A1 * | 5/2010 | Tanaka | A61B 1/0011 385/115 |
| 2011/0052121 | A1 * | 3/2011 | Zheng | G02B 6/2552 385/35 |
| 2011/0178509 | A1 * | 7/2011 | Zerfas | A61B 18/245 606/2.5 |
| 2011/0198324 | A1 * | 8/2011 | de Jong | G02B 6/245 219/121.72 |
| 2011/0229841 | A1 * | 9/2011 | Hamada | A61C 1/0046 433/29 |
| 2015/0032190 | A1 * | 1/2015 | Acker | A61N 5/0601 607/88 |
| 2015/0286000 | A1 * | 10/2015 | Zheng | G02B 6/255 65/377 |
| 2015/0336842 | A1 * | 11/2015 | Kaneuchi | G02B 6/02 65/392 |
| 2016/0016843 | A1 * | 1/2016 | Kaneuchi | G02B 6/2552 65/392 |

OTHER PUBLICATIONS

AFL Telecommunications LLC, EP Patent Application No. 15762043.6, European Search Report, dated Sep. 4, 2017; (2 pages).

Nanonics Imaging LTD, "Lens Fiber Probes", Feb. 1, 2002; [retrieved from the internet] [retrieved on Jun. 1, 2015], <URL: http://www.nanonics.co.il/products/spm-probes-and-nanotools/afm-probes/lens-fiber-probes.html>, p. 2, second figure; p. 3, table, p. 4, table.

AFL Telecommunications, LLC; International Patent Application No. PCT/US2015/020711; International Search Report; dated Jun. 29, 2015; (2 pages).

* cited by examiner

- By ball size
  - Type 1: Ball diameter > 2 x Fiber diameter
  - Type 2: 1.1 x fiber diameter > Ball diameter > 2 x Fiber diameter
  - Type 3: Ball diameter ≈ Fiber diameter
- Ball shape
  - Spherical ball
  - Elongated ball
  - Compressed ball

METHOD FOR MAKING BENT TIP FIBERS

CROSS-REFERENCE TO RELATED APPLICATIONS

This application is based upon and claims the benefit of priority from U.S. Provisional Patent Application No. 61/953,137, filed Mar. 14, 2014 in the United States Patent and Trademark Office, and as a U.S. national stage filing of International Application No. PCT/US2015/020711 having an international filing date of Mar. 16, 2015, the disclosures of both of which are incorporated by reference herein in their entireties.

BACKGROUND

1. Field

The invention is related to a method for making a bent tip fiber ball lens.

2. Related Art

The background information provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Ball lenses may be used with optical fibers to aid in focusing light emanating from an optical fiber, coupling light between adjacent optical fibers. As such, ball lenses are used for a variety of purposes in optical probes for biomedical applications. However, in some applications it is advantageous to have the ball lens that is bent at the end. For example, in some applications, there is a bundle of fibers with at least one fiber connected to a laser and at least one connected to a camera. The camera fiber can then be used to observe the operation of the laser. However, if the end of the camera fiber is too close to the end of the laser, the camera fiber can be damaged (melted) by the laser. Thus, a bent tip fiber is used to create a separation form the end of the camera fiber and the end of the laser.

For many of these medical applications, the ball lens fiber is designed for a one time use, due to the strong laser beam that will evaporate both the target and the fiber end. Therefore, there is a need for large quantities of bent ball lens. The requirement of production, automation, and repeatability is a major concern. The current manually heat and bend method relies too much on the experience of operators. Therefore, an automated programmable process using existing fully automated fusion splicers is a desired solution.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

According to an aspect of an exemplary embodiment, a method of making a bent tip fiber ball lens includes: moving a bender to a first side of a ball lens at an end of an optical fiber that has a first axis; moving the bender in a first direction such that the bender applies a force to the ball lens, wherein the ball lens and optical fiber is bent such that a first angle between the first axis and a second axis, which extends outward from an end of the ball lens and an end of the optical fiber is greater than zero; applying heat, for a first time, to said optical fiber at a location that is a first distance from said ball lens; removing the heat and allowing the optical fiber to harden such that the first angle is maintained after the bender force is removed.

Other features of the exemplary embodiment include the bender being moved by a fusion splicer and the heat being applied by the fusion splicer.

Other features of the exemplary embodiment include the first time being in a range between approximately 0.2 and 10 seconds.

Other features of the exemplary embodiment include the heat being applied by power in a range between 12 and 18 milliamps.

Other features of the exemplary embodiment include the first angle being in a range between approximately 30 and 90 degrees.

Other features of the exemplary embodiment include the bender being an optical fiber.

DETAILED DESCRIPTION

Figure 1A:
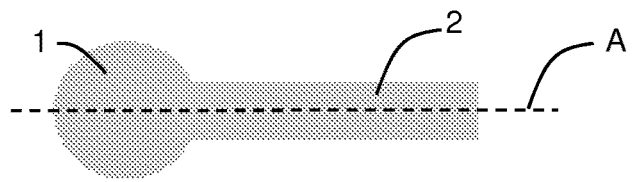
FIG. 1 illustrates an embodiment of a method for making a bent tip fiber ball lens.

The following detailed description is provided to assist the reader in gaining a comprehensive understanding of the apparatuses described herein. Various changes, modifications, and equivalents of the apparatuses described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Referring to the drawings, FIGS. 1A to 1D illustrate an embodiment of a method for making a bent tip fiber ball lens.

FIG. 1A shows a fiber ball lens 1 at the end of an optical fiber 2. In one embodiment, an exemplary optical fiber is a 125 micron single mode fiber. However, the method is not limited to 125 micron fibers. FIG. 1A also shows a first axis A that runs lengthwise through the center of optical fiber 2.

Figure 1B:
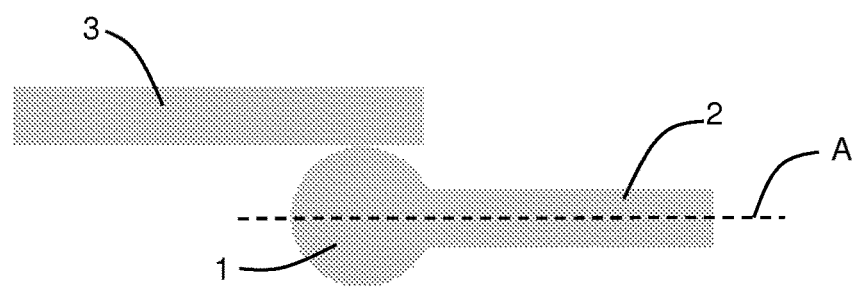

FIG. 1B shows a bender 3 that has been moved next to a first side of the ball lens 1 at the end of the optical fiber 2. In this embodiment, the bender 3 is a 125 micron single mode fiber. However, the bender 3 may be any other suitable material that can apply enough force to bend the ball lens 1 to a desired angle.

Figure 1C:
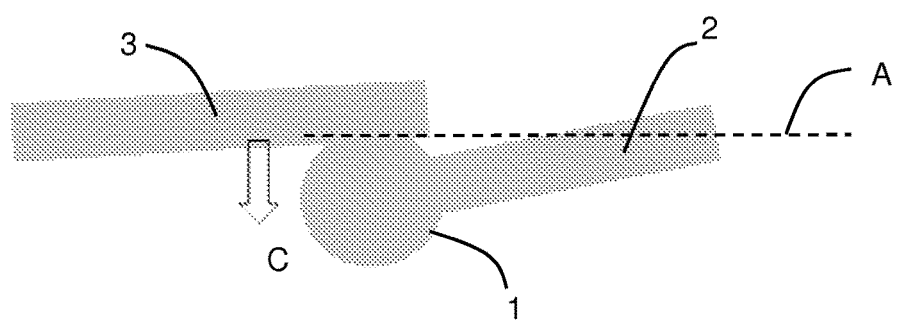
Figure 1D:
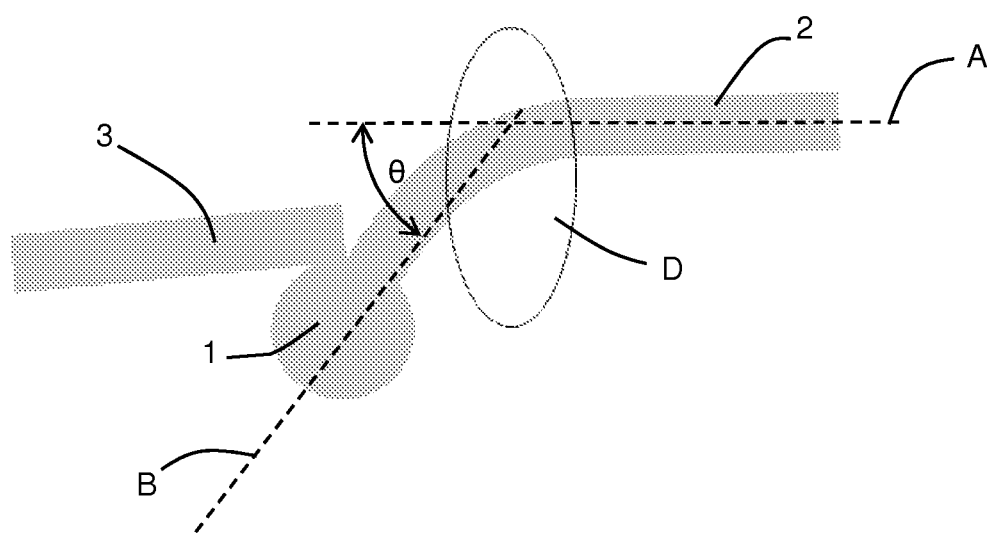

FIGS. 1C and 1D show the bender 3 being moved in a first direction C such that the bender applies a force to the ball lens 1. The force causes the ball lens 1 and the end of the optical fiber 2 to be bent such that a first angle θ between the first axis A and a second axis B, which extends outward from the end of end of the optical fiber 2 and ball lens 1, is greater than zero. While any bent angle can created, a preferred range of the first angle is between 30 and 90 degrees.

Next, heat is applied, for a first time, to the optical fiber 2 at a location D that is a first distance from the ball lens 1. A preferred first distance from the ball lens is approximately 0.5 mm to 25 mm. A preferred time for applying the heat is between approximately 0.2 and 10 seconds. A preferred heat may be generated by arc power that is generated by approximately 12-18 milliamps. The heat should be powerful enough and applied for enough time to slightly soften the optical fiber 2 without causing any significant degradation to the optical properties of the ball lens 1 or fiber 2.

Next, the heat is removed to allow the optical fiber 2 to harden such that the first angle θ is maintained between the first axis A and the second axis B after the bender 3 force is removed. A preferred time for the harden to take place is approximately 0.01 to 0.1 second.

Figure 2:
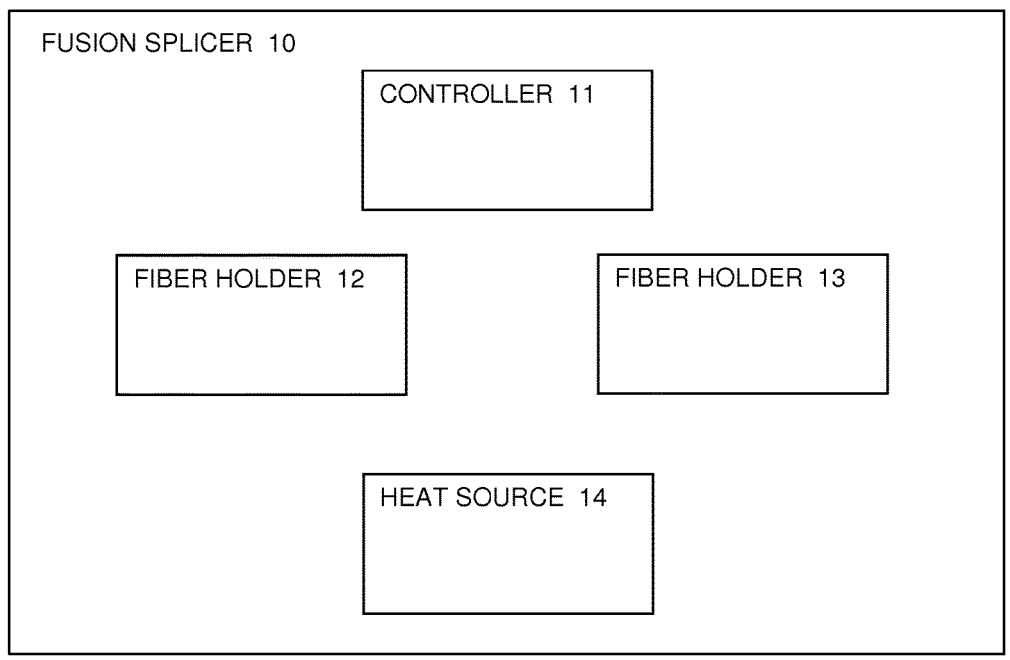
FIG. 2 illustrates an embodiment of a fusion splicer that can be used to perform a method for making a bent tip fiber ball lens.

FIG. 2 illustrates an embodiment of a conventional fusion splicer 10 that can be used to perform a method for making a bent tip fiber ball lens. The major elements of the fusion splicer 10 pertinent to the method are a controller 11, fiber holders 12, 13 and heat source 14. The controller 11 controls the operation of the fiber holders 12, 13 and heat source 14. The fiber holders 12, 13 are configured to hold the bender 3 and optical fiber 2, for example, by use of a V-groove clamp. However, other known holding configurations may be used. The fiber holders 12, 13 are also configured to move in the X, Y and Z directions, similar to the movements that are necessary to perform fusion splicing. This movement can be used to move the bender 3 to apply a bending force to the ball lens 1. The heat source 14 may be generated by arc power. In an exemplary embodiment, the heat source 14 is generated by approximately 14-15 milliamps and is applied to area D, a first distance from the ball lens as shown in FIG. 1D. One example of a conventional fusion splicer that can perform the method is the Fujikura LZM-100 LAZERMaster.

Figure 3:
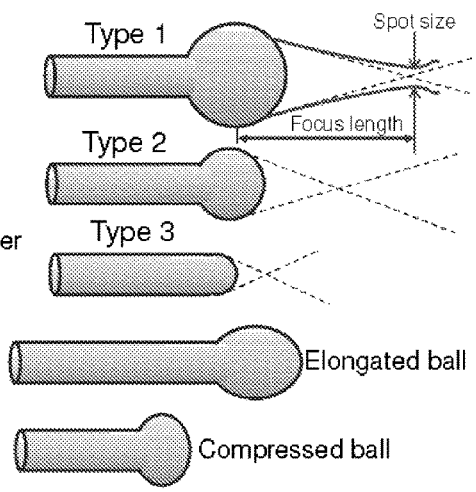
FIG. 3 shows examples of different types of fiber ball lenses.

FIG. 3 shows examples of different types of fiber ball lenses that can be used in the exemplary method.

Figure 4:
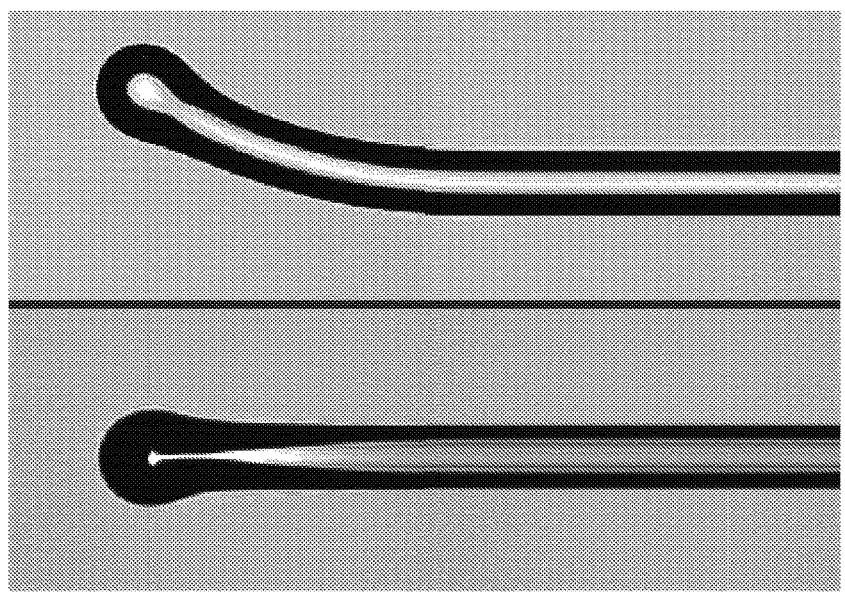
FIG. 4 shows two photographs of an exemplary bent tip fiber made with an embodiment of the invention.

FIG. 4 shows two photographs of an exemplary bent tip fiber made with an embodiment of the invention. The bent angle is approximately 30 degrees. The top photograph is a side view and the bottom photograph is a top view.

As mentioned above, the embodiments described above are merely exemplary and the general inventive concept should not be limited thereto. While this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

What is claimed is:

1. A method of making a bent tip fiber ball lens comprising:
   holding a bender with a first fiber holder of a fusion splicer;
   holding an optical fiber that has a first axis with a second fiber holder of the fusion splicer;
   moving the bender, by the fusion splicer, to a first side of a ball lens at an end of the optical fiber;
   moving said bender, by the first fiber holder of the fusion splicer, in a first direction such that said bender applies a force to said ball lens, wherein said ball lens and optical fiber is bent such that a first angle between said first axis and a second axis, which extends outward from an end of said ball lens and an end of said optical fiber, is greater than zero;
   applying heat, with the fusion splicer, for a first time, to said optical fiber at a location that is a first distance from said ball lens; and
   removing said heat and allowing said optical fiber to harden such that said first angle is maintained after said bender force is removed;
   wherein the bender is an optical fiber.

2. The method according to claim 1, wherein said first time is in a range between approximately 0.2 and 10 seconds.

3. The method according to claim 2, wherein said heat is applied by power in a range between 12 and 18 milliamps.

4. The method according to claim 3, wherein said first angle is in a range between approximately 30 and 90 degrees.

5. The method according to claim 2, wherein said first angle is in a range between approximately 30 and 90 degrees.

6. The method according to claim 1, wherein said heat is applied by power in a range between 12 and 18 milliamps.

7. The method according to claim 6, wherein said first angle is in a range between approximately 30 and 90 degrees.

8. The method according to claim 1, wherein said first angle is in a range between approximately 30 and 90 degrees.

9. A method of making a bent tip fiber ball lens comprising:
   moving a bender to a first side of a ball lens at an end of an optical fiber that has a first axis;
   moving said bender in a first direction such that said bender applies a force to said ball lens, wherein said ball lens and optical fiber is bent such that a first angle between said first axis and a second axis, which extends outward from an end of said ball lens and an end of said optical fiber is greater than zero;
   applying heat, for a first time, to said optical fiber at a location that is a first distance from said ball lens; and
   removing said heat and allowing said optical fiber to harden such that said first angle is maintained after said bender force is removed;
   wherein said bender is an optical fiber and wherein the bender is held by a first fiber holder of a fusion splicer during the moving steps and the optical fiber that has a first axis is held by a second fiber holder of the fusion splicer during the moving steps.

10. The method according to claim 9, wherein said heat is applied by said fusion splicer.

11. The method according to claim 9, wherein said first time is in a range between approximately 0.2 and 10 seconds.

12. The method according to claim 9, wherein said heat is applied by arc power generated by a current in a range between 12 and 18 milliamps.

13. The method according to claim 9, wherein said first angle is in a range between approximately 30 and 90 degrees.

* * * * *